US009507756B2

(12) United States Patent
Arad et al.

(10) Patent No.: US 9,507,756 B2
(45) Date of Patent: Nov. 29, 2016

(54) SPACE EFFICIENT COUNTERS IN NETWORK DEVICES

(71) Applicant: Marvell Israel (M.I.S.L) Ltd., Yokneam (IL)

(72) Inventors: Carmi Arad, Nofit (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 637 days.

(21) Appl. No.: 13/744,093

(22) Filed: Jan. 17, 2013

(65) Prior Publication Data

US 2013/0185343 A1     Jul. 18, 2013

Related U.S. Application Data

(60) Provisional application No. 61/587,928, filed on Jan. 18, 2012, provisional application No. 61/644,345, filed on May 8, 2012, provisional application No. 61/652,794, filed on May 29, 2012.

(51) Int. Cl.
   *G06F 17/10*   (2006.01)
   *H04L 12/861*  (2013.01)

(52) U.S. Cl.
   CPC .............. *G06F 17/10* (2013.01); *H04L 49/90* (2013.01)

(58) Field of Classification Search
   None
   See application file for complete search history.

(56) References Cited

U.S. PATENT DOCUMENTS

| | | | |
|---|---|---|---|
| 7,304,994 B2 | 12/2007 | Dubnicki et al. | |
| 7,936,687 B1 | 5/2011 | Parker et al. | |
| 2004/0184404 A1 | 9/2004 | Carpenter et al. | |
| 2004/0184444 A1 | 9/2004 | Aimoto et al. | |
| 2004/0203559 A1 | 10/2004 | Stojanovic et al. | |
| 2004/0228197 A1* | 11/2004 | Mokhlesi | G11C 16/06 365/232 |
| 2005/0226201 A1* | 10/2005 | McMillin | 370/348 |
| 2006/0182112 A1 | 8/2006 | Battle et al. | |
| 2008/0002685 A1 | 1/2008 | Joo et al. | |
| 2009/0257352 A1 | 10/2009 | Imai | |
| 2010/0150163 A1 | 6/2010 | Ahn et al. | |
| 2012/0057601 A1 | 3/2012 | Voruganti et al. | |
| 2014/0328196 A1 | 11/2014 | Arad et al. | |

FOREIGN PATENT DOCUMENTS

EP    2 490 379    8/2012

OTHER PUBLICATIONS

Approximate Counting Algorithm—Wikipedia, the Free Encyclopedia. Retrieved from the Internet on Jan. 17, 2013: http://en.wikipedia.org/wiki/Approximate_counting_algorithm.
Stanojević, "Small Active Counters," IEEE Infocom Proceedings, May 6-May 12, 2007, 9 pages.

(Continued)

*Primary Examiner* — Michael D Yaary

(57) ABSTRACT

A network device includes a memory and a counter update logic module. The memory is configured to store a plurality of bits. The counter update logic module is configured to estimate a count of quanta within a plurality of data units in a data flow based on statistical sampling of the plurality of data units, and to store the estimated count of quanta in the memory as m mantissa bits and e exponent bits. Them mantissa bits represent a mantissa value M and the e exponent bits represent an exponent value E.

28 Claims, 7 Drawing Sheets

(56) References Cited

OTHER PUBLICATIONS

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).
ITU-T Recommendation Y.1564, "Ethernet service activation test methodology," *Int'l Telecommunication Union*, pp. 1-38 (Mar. 2011).
MEF 10.2 Technical Specification, "Ethernet Services Attributes Phase 2," *The Metro Ethernet Forum 2009*, pp. 1-65 (Oct. 27, 2009).
MEF 10.3 Technical Specification, "Ethernet Services Attributes Phase 3," *The Metro Ethernet Forum 2009*, pp. 1-120 (Oct. 2013).
Heinanen et al., RFC 2697, "A Single Rate Three Color Marker," *The Internet Society*, pp. 1-6 (Sep. 1999).
Heinanen et al., RFC 2698, "A Two Rate Three Color Marker," *The Internet Society*, pp. 1-5 (Sep. 1999).
U.S. Appl. No. 13/773,930, filed Feb. 22, 2013.
U.S. Appl. No. 13/898,942, filed May 21, 2013.
Office Action in U.S. Appl. No. 14/269,664, dated Sep. 29, 2015 (10 pages).
International Search Report and Written Opinion in PCT/IB2014/001750, dated Dec. 4, 2014 (12 pages).
International Preliminary Report on Patentability in International Application No. PCT/IB2014/001750, mailed Nov. 12, 2015 (9 pages).
Office Action in U.S. Appl. No. 14/269,664, dated May 12, 2016 (12 pages).
Jurga et al., "Technical Report: Packet Sampling for Network Monitoring," 18 pages, dated Dec. 10, 2007; retrieved from https://openlab-mu internal.web.cern.ch/openlab-mu-internal/03_Documents/3_Technical_Documents/Technical_Reports/2007/RJMM_SamplingReport.pdf, on May 5, 2016.

* cited by examiner

SPACE EFFICIENT COUNTERS IN NETWORK DEVICES

CROSS-REFERENCE TO RELATED APPLICATION

This disclosure claims the benefit of U.S. Provisional Patent Application No. 61/587,928, entitled "Increasing Device Counters" and filed on Jan. 18, 2012, U.S. Provisional Patent Application No. 61/644,345, entitled "Increase Device Counters" and filed on May 8, 2012, and U.S. Provisional Patent Application No. 61/652,794, entitled "Increase Device Counters" and filed on May 29, 2012, the disclosures of which are hereby incorporated by reference herein in their entireties.

FIELD OF TECHNOLOGY

The present disclosure relates generally to counters and, more particularly, to counters utilized in communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication networks typically employ network devices such as bridges and routers to forward information within the network. Efficient management of communication networks requires monitoring various operational attributes of the network devices, as well as operational attributes of the network itself. Monitoring such attributes often requires counters, the use of which has expanded dramatically in recent years. The physical space required to accommodate all of the different counters used in network applications has grown accordingly.

SUMMARY

In an embodiment, a network device includes a memory and a counter update logic module. The memory is configured to store a plurality of bits. The counter update logic module is configured to estimate a count of quanta within a plurality of data units in a data flow based on statistical sampling of the plurality of data units, and to store the estimated count of quanta in the memory as m mantissa bits and e exponent bits. The m mantissa bits represent a mantissa value M and the e exponent bits represent an exponent value E.

In another embodiment, a method in a network device includes estimating a count of quanta within a plurality of data units in a data flow based on statistical sampling of the plurality of data units, and storing the estimated count of quanta in a memory as m mantissa bits and e exponent bits. The m mantissa bits represent a mantissa value M and the e exponent bits represent an exponent value E.

In another embodiment, a network device includes a memory configured to store a plurality of bits, a first counter, a second counter, and a controller. The first counter is configured to provide an exact count of first quanta within a first plurality of data units, and to store the exact count of first quanta in the memory as a binary number. The second counter is configured to provide an estimated count of second quanta within a second plurality of data units, and to store the estimated count of second quanta in the memory as m mantissa bits and e exponent bits. The m mantissa bits represent a mantissa value M and the e exponent bits represent an exponent value E. The controller is configured to, in response to one or more indications of desired counter precision, (i) employ the first counter for use in a first application, and (ii) employ the second counter for use in a second application different than the first application.

In another embodiment, a method in a network device includes providing, using a first counter, an exact count of first quanta within a first plurality of data units, storing the exact count of first quanta in a memory as a binary number, providing, using a second counter, an estimated count of second quanta within a second plurality of data units, and storing the estimated count of second quanta in a memory as m mantissa bits and e exponent bits. The m mantissa bits represent a mantissa value M and the e exponent bits represent an exponent value E. The method also includes, in response to one or more indications of desired counter precision, (i) employing the first counter for use in a first application, and (ii) employing the second counter for use in a second application different than the first application.

DETAILED DESCRIPTION

In some applications, exact counts of data units (e.g., packets or cells) that pass through a network device, or of the total number of bytes within those data units, are not required. For example, some applications that indicate whether a data unit flow is relatively high-bandwidth, or that generate histograms showing distributions of data units across various ranges or categories, may convey useful information without knowledge of any exact data unit counts or byte counts. In some embodiments described below, a counter in a network device estimates a data unit count or byte count using a statistical process, in order to reduce the number of counter bits used for such applications without necessarily decreasing the maximum counter value. To represent the value of the statistical counter, one or more bits are allocated to a mantissa value and one or more bits are allocated to an exponent value. In an embodiment, the counter value is incremented, if at all, by increasing the mantissa value by one, or by increasing the exponent value by one (and rolling over the mantissa value) when the maximum mantissa value has been reached. Moreover, whereas a traditional binary (exact) counter increments the counter value for every detected data unit (or byte), the statistical counter only increments the counter value with a probability that decreases as the exponent value increases, in an embodiment. Thus, in this embodiment, the probability of counting a data unit decreases as the exponent value (and therefore counter value) increases, but each successive "counted" data unit increments the counter value by a larger amount. In some embodiments where the statistical counter counts bytes rather than data units, the counter value is still incremented with a particular probability for each detected data unit, but the probability is increased by a factor proportional to either the length of the detected data unit, or a quantity represented by a number of least significant bits of the detected data unit.

Figure 1:
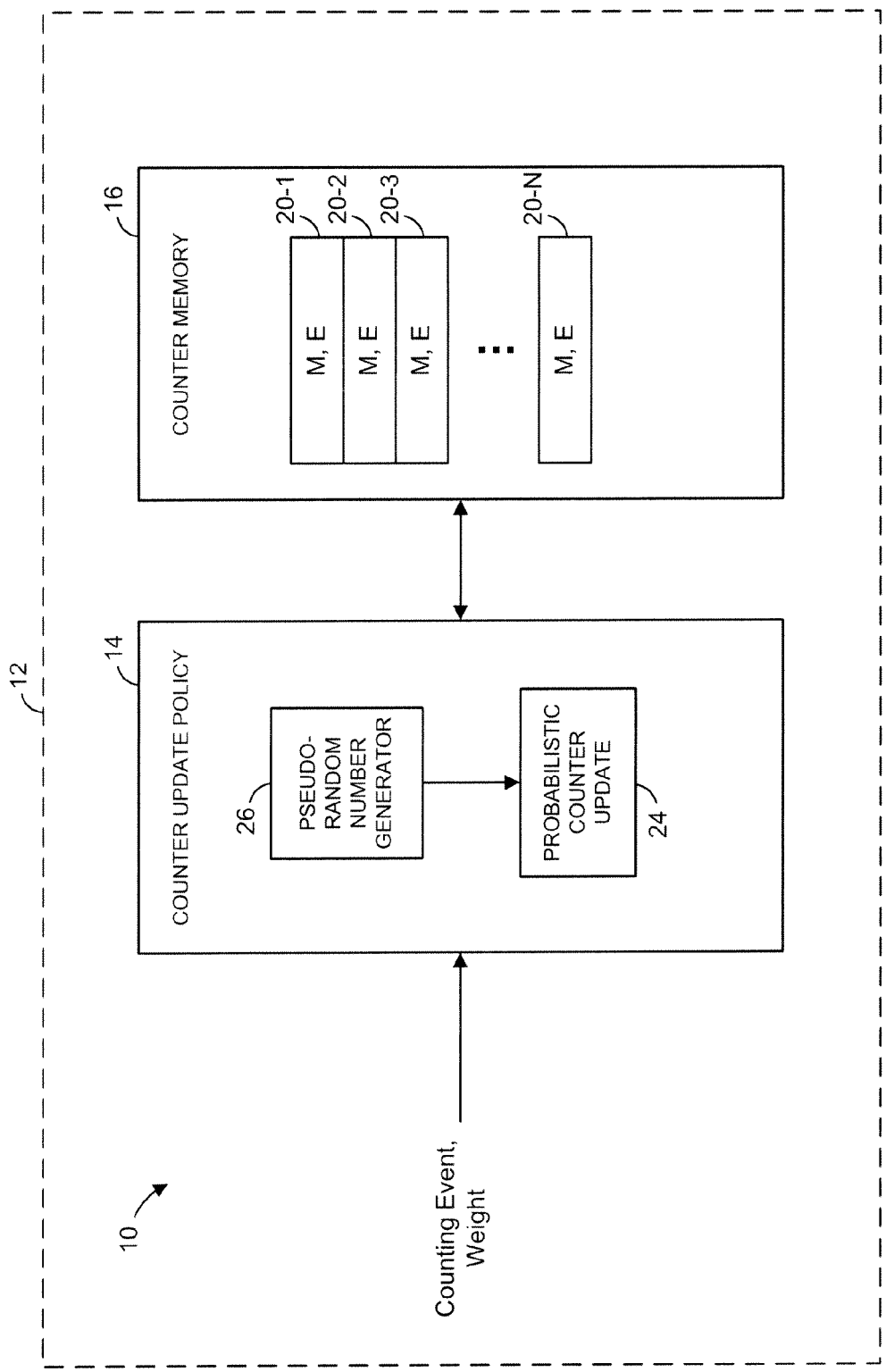
FIG. 1 is a block diagram of an example counter that utilizes counting techniques of the present disclosure, according to an embodiment.

In other embodiments described below, a network device is configurable such that finite counter resources may be assigned based on the needs of a particular client/application. In these embodiments, an application requests counter resources (e.g., bit storage and counter update logic) capable of providing a desired number of counters having various counter parameters. In an embodiment, the counter parameters include the desired accuracy or precision of each requested counter (e.g., whether counters are exact or statistical counters, and/or a number of mantissa bits, in an embodiment), and the number of counter bits. A single number of bits is specified for each exact counter, while a number of mantissa bits and a number of exponent bits are specified for each statistical counter, in an embodiment. The counter resources are then configured by setting the counter update logic according to the desired counter parameters, and by allocating bits of a memory according to the determined bit allocations, in an embodiment. Thus, finite counter resources can be assigned in a manner that satisfies the needs of a particular application without wasting excess bits. For example, maximum counter values may be set to the lowest acceptable levels, statistical counters may be used in place of bit-intensive binary counters wherever exact data unit or byte counts are not needed, and accuracies of statistical counters may be set to the lowest acceptable levels, in an embodiment. FIG. 1 is a block diagram of an example counter block 10 that utilizes data unit (e.g., packet or cell) counting techniques and/or byte counting techniques of the present disclosure, according to an embodiment. The counter block 10 is included in a network device 12, such as a router, bridge, or other network switch, for example. In one embodiment, the network device 12 is configured to operate within an Ethernet communication system. For ease of explanation, the embodiment of FIG. 1 is described below with specific reference to packets. It is understood, however, that other, similar embodiments instead operate with respect to other suitable types of data units. In some embodiments, for example, the embodiments count cells (or bytes, or other units within cells, etc.) rather than packets.

The counter block 10 includes a counter update policy module 12, which includes logic that manages operation of N counters within counter block 10. To change a current value of a counter within counter block 10, the counter update policy module 14 manipulates particular bits within count value bits 20-1 through 20-N, stored in a memory 16, that represent the counter value. The count value bits 20-1 through 20-N each include one or more mantissa bits and one or more exponent bits. The number of mantissa and/or exponent bits varies from counter to counter, in some embodiments and/or scenarios. In various embodiments and/or scenarios, for example, count value bits 20-1 include more or fewer mantissa bits, and/or more or fewer exponent bits, than count value bits 20-2. In one alternative embodiment, the memory 16 includes only count value bits 20-1 corresponding to a single counter. Each counter within counter block 10 has a counter value C equal to $M*2^E$, where M is the mantissa value represented by the corresponding mantissa bits and E is the exponent value represented by the corresponding exponent bits, in an embodiment. For ease of explanation, the embodiment of FIG. 1 is described below with specific reference to operation of a counter corresponding to the count value bits 20-1. In some embodiments, each of the other (N−1) counters operates in a similar manner.

The counter update policy module 14 increments the counter value of a counter based on "counting event" and "weight" indicators received by the counter update policy module 14. In one embodiment, each "counting event" indicator indicates that a particular packet satisfies one or more criteria, such as having one or more packet characteristics (e.g., belonging to a particular flow as identified by one or more packet field values, exceeding a particular byte length, having a source or destination address in a particular address range, etc.) and/or being in a particular packet state (e.g., received, forwarded, in a queue, dropped, etc.). In various different embodiments, the "counting event" indicators are generated by a packet detector (not seen in FIG. 1) that operates on received packets (e.g., packets received by the network device 12), or on headers, descriptors, or other information associated with received packets. For ease of explanation, "detecting a packet" refers herein to determining that the packet has one or more particular characteristics and/or is in one or more particular states, and a "detected packet" refers herein to a packet that has been determined to have the requisite characteristic(s) and/or to be in the requisite state(s).

When the counter update policy module 14 receives a "counting event" indicator, the counter update policy module 14 increments the counter value represented by count value bits 20-1 only with a probability P. In one embodiment, the counter value, when incremented, is incremented by increasing the mantissa value M by one unless a maximum mantissa value (e.g., the maximum value that can be represented by the mantissa bits of count value bits 20-1) has been reached, in which case the exponent value E is increased by one and the mantissa value M rolls over.

As noted above, the counter update policy module 14 increments the counter value only with a probability P. In one embodiment where packets are counted, the probability that the counter value is incremented for a given "counting event" indicator is $P=\frac{1}{2}^E$. Thus, as the exponent and counter values increase in the manner described above, there is a progressively smaller chance that each additional detected packet will be "counted" (i.e., cause the counter value to increase). This is offset, however, by the fact that, as the exponent value increases, each detected packet that is counted will increase the counter value by a progressively larger amount. While this approach provides only a statistical approximation of the actual count of detected packets, it allows a fixed number of bits to represent a much higher maximum counter value as compared to exact, binary counters. For example, a binary counter with eight bits can indicate a counter value up to $2^8-1$, or 255, while a statistical counter with eight bits can indicate a much larger value (e.g., up to $7*2^{31}$, or 15,032,385,536, for three mantissa bits and five exponent bits). The maximum counter value increases steeply as the number of bits allocated to the exponent (e.g., the exponent bits in count value bits 20-1) is increased and, to a lesser extent, as the number of bits allocated to the mantissa (e.g., the mantissa bits in count value bits 20-1) is increased. The resolution in the counter value, and therefore the counter accuracy and precision with respect to the actual count of detected packets, also increases as the number of mantissa bits is increased. In an embodiment, at least two mantissa bits are included in the count value bits 20-1.

To test whether the counter value should be incremented in response to receiving a "counting event" indicator, in an embodiment, a probabilistic counter update module 24 within the counter update policy module 14 both (1) calculates the probability $P=\frac{1}{2}^E$ of incrementing the counter value for each "counting event" indicator, based on the current exponent value E as indicated by the exponent bits within count value bits 20-1, and (2) compares the calculated probability P to a pseudorandom number generated by and received from a pseudorandom number generator 26. In an embodiment, the pseudorandom number generator 26 generates numbers between zero and one with a uniform distribution, and the probability P is always greater than zero but less than one. In one embodiment, the pseudorandom number generator 26 provides pseudorandom numbers for use by each of the N counters within the counter block 10.

In some embodiments and/or scenarios, one or more counters within counter block 10 count bytes rather than packets. To approximate a byte count based on the "counting event" indicators, in an embodiment, "blocks" of bytes are counted rather than individual bytes, and the counter value should therefore be multiplied by the byte block size (e.g., by a digital processor sampling the counter value represented by the count value bits 20-1) in order to determine the estimated byte count. In one embodiment, for example, counting is performed in blocks of q bytes, where q is the counting quanta unit (i.e., where counting is performed in multiples of q). In various embodiments, q reflects the minimum packet length (e.g., 64 bytes for Ethernet packets), and/or any other suitable quanta that provides a counting accuracy/precision sufficient for a particular networking application. In some embodiments and/or networking applications, q is equal to one (e.g., one byte).

In one byte-counting embodiment, the probabilistic counter update module 24 calculates an increment probability P for each "counting event" indicator, where P is determined based (1) on the packet length L of the packet that corresponds to the "counting event" indicator. (2) the counting quanta unit q, and (3) the current exponent value E. Specifically, in one embodiment, the packet length L is normalized to the counting quanta q to determine a normalized packet length $L_q=L/q$, and P is then determined by dividing the E least significant bits (LSBs) of $L_q$ by $2^E$. Also, in this embodiment, the mantissa value M is incremented by an additional amount when $L_q$ has one or more non-zero bits in addition to the E LSBs. This embodiment is described in more detail with reference to FIG. 3, below.

The length of each packet is determined based on the "weight" indicator, which is either the packet length L, the normalized packet length $L_q$, or another suitable measure indicating the packet length, in various embodiments. In an embodiment, the counter update policy module 14 receives the "weight" indicators for detected packets from another processing unit (not seen in FIG. 1), and the probabilistic counter update module 24 is therefore aware of the byte length of each packet. If all packets have the same length, then, in one embodiment, it is sufficient to count packets and not bytes (e.g., bytes may be determined separately from the counter 10, simply by multiplying the counter value by the fixed packet length). In this embodiment and/or scenario, therefore, the increment probability P is equal to $\frac{1}{2}^E$. In some embodiments where all packets have the same lengths, or where packets are counted rather than bytes, no "weight" indicators are provided to the counter update policy module 14.

In one embodiment where the counter is a byte counter, where P is equal to the E LSBs of $L_q$ divided by $2^E$, and where the counter value $C=M*2^E$, the mantissa and exponent values are incremented in the same manner as described above for the example packet counter (i.e., by increasing the mantissa value by one until a maximum value is reached, at which point the mantissa value rolls over and the exponent value is increased by one). In some instances, however, the mantissa value M and/or the exponent value E may increment by more than one, as described with reference to FIG. 3, below. To determine the estimated byte count, in an embodiment, the counter value $C=M*2^E$ is multiplied by q (e.g., by a digital processor that samples the counter value C), such that the estimated number of bytes is equal to $C_{est}=q*M*2^E$.

In the byte-counting embodiments described above, the counter counts in units equal to the minimum packet length (in bytes). In various other embodiments, however, the counter counts in units of any other suitable quanta. Thus, by changing q it is possible to obtain counter estimations for bits, nibbles, bytes, words, etc., either individually or in blocks of any size.

Table 1 illustrates how counter bits (and therefore die area) may be saved by using statistical counters similar to the counters of counter block 10 rather than exact counters, for an example case of one packet counter and one byte counter:

TABLE 1

| Counter | Exact Counter | | Statistical Counter | |
|---|---|---|---|---|
| Type | Size (bits) | Max Value | Size (bits) | Max Value |
| Packet | 29 | $2^{29}$ | 16 (11m, 5e) | $2^{43} - 1$ |
| Byte | 35 | $2^{35}$ | 16 (11m, 5e) | $2^{49} - 1$ (q = 64) or $2^{43} - 1$ (q = 1) |
| Total | 64 bits | | 32 bits | |

As seen in Table 1, half as many bits may be used to provide much larger packet and byte counter values, at the cost of count inaccuracies resulting from the count resolution provided by the mantissa bits, the counting quanta q, and the inherent inaccuracies resulting from a statistical counting method. As noted above, the number of mantissa bits determines the accuracy and precision of a statistical counter such as the example counters of counter block 10.

Figure 2:
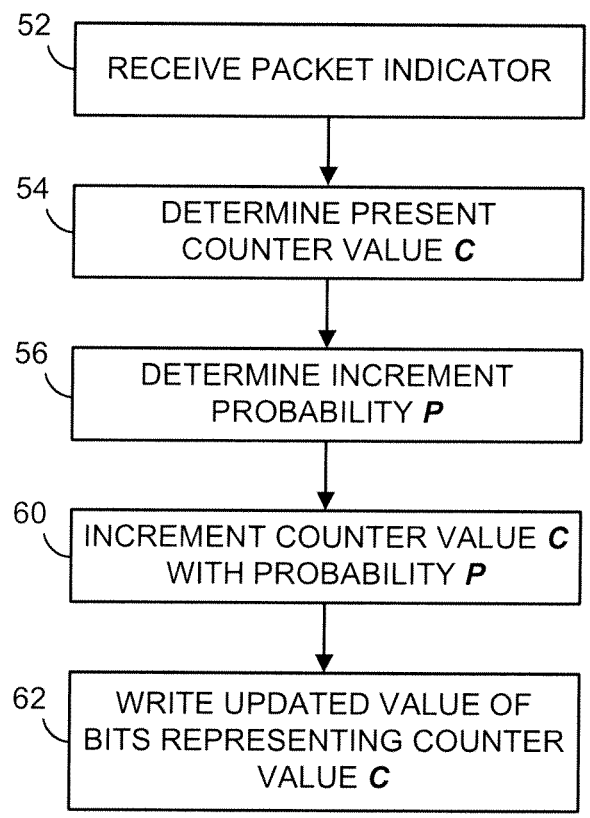
FIG. 2 is a flow diagram of an example method of estimating a count in a network device using a statistical counter, according to an embodiment.

FIG. 2 is a flow diagram of an example method 50 of estimating a count in a network device using a statistical counter, according to an embodiment. In various embodiments, the method 50 is implemented in whole or in part by the counter update policy module 14 in the network device 12 of FIG. 1. As with FIG. 1, the embodiment of FIG. 2 is described with specific reference to packets. Again, however, it is understood that other embodiments instead operate with respect to other suitable types of data units (e.g., cells).

The method 50 estimates a count of quanta, where each quanta is any suitable counting unit (e.g., packets, number of bytes in a minimum packet length, etc.). Moreover, in an embodiment, the quanta are counted with respect to packets in a particular packet flow, where the packet flow can be defined in any suitable manner (e.g., packets having a particular header field value, packets that have been received, packets that have been dropped, etc.). The method 50 is repeated for each of a plurality of packets, in an embodiment.

At block 52, a packet indicator is received. The packet indicator corresponds to a particular packet within the relevant "flow," and indicates that the packet has been detected. In various embodiments, the packet indicator is a signal received from a packet processing unit in the same network device implementing the method 50, or from a different network device. In one embodiment, for example, the received signal is normally at a "low" level, and a packet is indicated each time the signal transitions to a "high" level (or vice versa). In one embodiment, the packet indicator is similar to one of the "counting event" indicators described with reference to FIG. 1.

At block 54, the present counter value, C, is determined. In an embodiment, the counter value is determined by reading bits in a memory, such as the mantissa and exponent bits included in the count value bits 20-1 stored in memory 16 of FIG. 1. In an embodiment, the counter value C is equal to $M*2^E$, where M is the mantissa value as represented by m mantissa bits and E is the exponent value as represented by e exponent bits.

At block 56, an increment probability P is determined. In an embodiment, the increment probability P is a value that decreases exponentially as the exponent value E is incremented (and thus, as the counter value C increases). In one embodiment where the method 50 represents the operation of a packet counter (i.e., where the counter value C is an estimate of a number of packets), the increment probability P is equal to $\frac{1}{2}^E$. In one embodiment where the method 50 represents the operation of a byte counter, and where packets have a minimum byte length equal to the counting quanta q, the increment probability P is equal to $L_e/2^E$, where $L_e$ is equal to the E LSBs of L/q (e.g., as described in more detail below with reference to FIG. 3).

At block 60, the counter value C is incremented with probability P, where P is the probability P that was determined at block 56. In one embodiment, the determination whether the counter value C is incremented is made by comparing a pseudorandom number to the probability P. In an embodiment, the pseudorandom number is generated by a pseudorandom number generator similar to the pseudorandom number generator 26 of FIG. 1. In one embodiment where the method 50 represents the operation of a packet counter, incrementing the counter value C includes incrementing the mantissa value M by one, or incrementing the exponent value E (and resetting M) if M reaches its maximum value and rolls over. In one embodiment where the method 50 represents the operation of a byte counter, incrementing the counter value C includes incrementing the mantissa value M and/or the exponent value E according to the process of FIG. 3, or a suitable equivalent process.

At block 62, the updated values of the m mantissa bits and the e exponent bits (i.e., the binary values that represent the mantissa value M and exponent value E that correspond to the incremented counter value C) are written to the counter memory. In some embodiments, bits are only written or overwritten at block 62 if the value of those bits has changed as a result of an increment at block 60. In one embodiment, for example, in a scenario where an increment does not occur at block 60, no bits are overwritten at block 62. In other embodiments, bits are overwritten at block 62 regardless of the outcome of block 60 (e.g., a write operation occurs for each mantissa bit and/or each exponent bit, even if the bits are merely overwritten with the same bit values).

In some embodiments, the blocks of the method 50 occur in a different order than seen in FIG. 2. In one embodiment, for example, the increment probability P is determined at block 56 before the packet indicator is received at block 52. In another example embodiment, a packet indicator for a second detected packet is received at block 52 (in a second iteration of the method 50) before, or while, the updated counter value bits are written at block 62, the counter value C is incremented with probability P at block 60, and/or the increment probability P is determined at block 56, for a first detected packet in a first iteration of the method 50.

Figure 3:
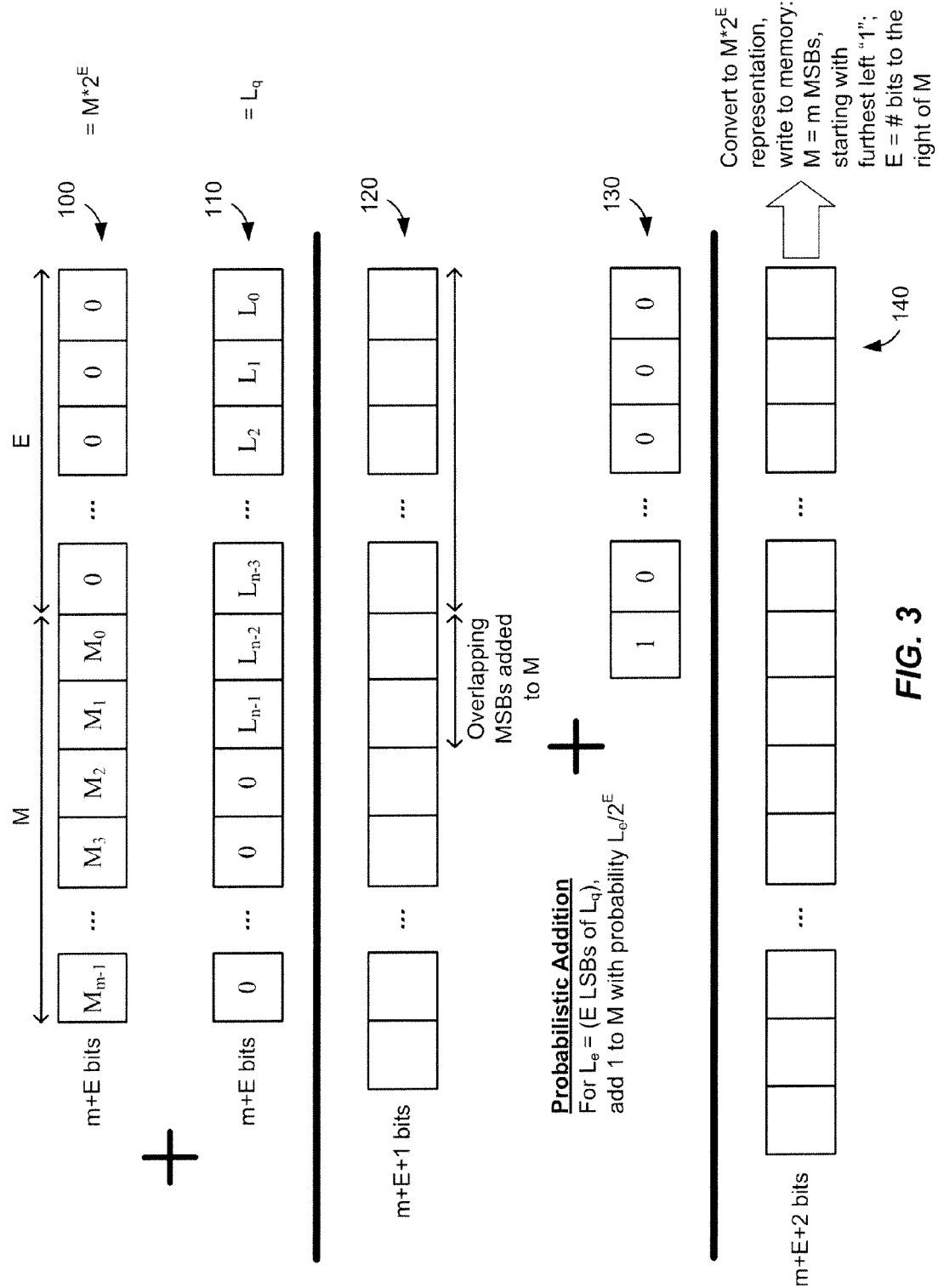
FIG. 3 is a diagram illustrating the operation of an example counter update procedure according to an embodiment.

FIG. 3 is a diagram illustrating the operation of an example counter update procedure, according to an embodiment. In one embodiment, the operations seen in FIG. 3 correspond to a scenario in which the counter update policy module 14 receives a "counting event" indicator, and a corresponding "weight" indicator specifying the packet length.

In FIG. 3, a set of initial counter value bits 100 includes m mantissa bits and E tailing zeros (e.g., a number of tailing zeros that is equal the current integer value of the exponent that is represented by the e exponent bits). Adding the E tailing zeros serves to convert the mantissa value M to the current integer count value, $M*2^E$. It is understood, however, that FIG. 3, and the accompanying description herein, is merely intended to facilitate an understanding of the counter update procedure according to an embodiment. In some embodiments, for example, the actual implementation performs operations that are equivalent to the operations of FIG. 3, without converting counter value bits to or from an integer format (e.g., without inserting the E trailing zeros, etc.).

Packet length bits 110 represent the quanta length, $L_q$, of a detected packet (i.e., the packet length L normalized to the counting quanta q, such that $L_q=L/q$). In an embodiment where packets may be as large as 511 quanta, for example, packet length bits 110 include at least n=9 bits. As seen in FIG. 3, the most significant bits (MSBs) of the packet length bits 110 that overlap the shifted mantissa bits of the initial counter value bits 100 are added to the mantissa value M, resulting in first sum bits 120. In the example embodiment of FIG. 3, this addition only occurs if n is greater than E (i.e., if the packet length is greater than a threshold length, where the threshold length increases as E increases), in which case the (n−E) MSBs of the packet length bits are added to the mantissa value M. In one embodiment, the LSBs of the packet length bits 110 that overlap the E trailing zero bits of the initial counter bits 100 are not added to the initial counter value bits 100 or to the first sum bits 120. However, bits 130 are added to the first sum bits 120 with an increment probability P that is equal to $L_e/2^E$, where $L_e$ is equal to the E LSBs of the packet length bits 110, in an embodiment. Thus, while the E LSBs of the packet length bits 110 are not added to the counter value in this embodiment, they do affect the increment probability P for the packet. Because E increases with the counter value, the increment probability P reduces to $L_q/2^E$ when the counter value is much larger than $L_q$.

The bits 130, when added to bits 120, increase the mantissa value M by one. The resulting new counter value bits 140 provide an integer representation of the new counter value, which either incorporates or does not incorporate the addition of bits 130 according to the increment probability P. Once the new counter value bits 140 are determined, the new counter value is converted to the exponential representation $M*2^E$, in an embodiment. To convert the new counter value, in an embodiment, the m MSBs of the new counter value bits 140, starting at and including the most significant (i.e., furthest left) "1" value included in the bits 140, are stored as the in mantissa bits in a memory, and the number of bits to the right of those m mantissa bits in the bits 140 is equal to the exponent value E. Converting the exponent value E to a binary number provides the e exponent bits that are stored in a memory, in an embodiment.

Two operations inherently take place as a result of converting the new counter value bits 140 to the exponential representation in the manner described above. First, when the mantissa value M rolls over (i.e., in a "wrap-around"), the new mantissa value M is equal to zero plus any residue of the addition. Moreover, if the number of bits m representing the mantissa value M is relatively small, then the mantissa value M may wrap-around several times in a single counter update operation, causing E to increment by more than one. Again, however, the actual implementation instead performs other operations that are equivalent to the operations of FIG. 3, without converting counter value bits to or from an integer format, in some embodiments.

In some embodiments, a digital processor (e.g., a CPU) increases the effective maximum counter value of the counter 10 by implementing a digital counter that occasionally (e.g., periodically) samples the mantissa and exponent bits of the counter 10, processor calculates a counter value corresponding to each sampled set of mantissa and exponent bits, and resets the mantissa and exponent bits to zero. In some embodiments and/or applications, the digital processor adds each counter value to the digital counter value. In other embodiment and/or applications, the digital processor utilizes the sampled value of the counter 10, but does not retain or calculate a digital counter value.

Figure 4:
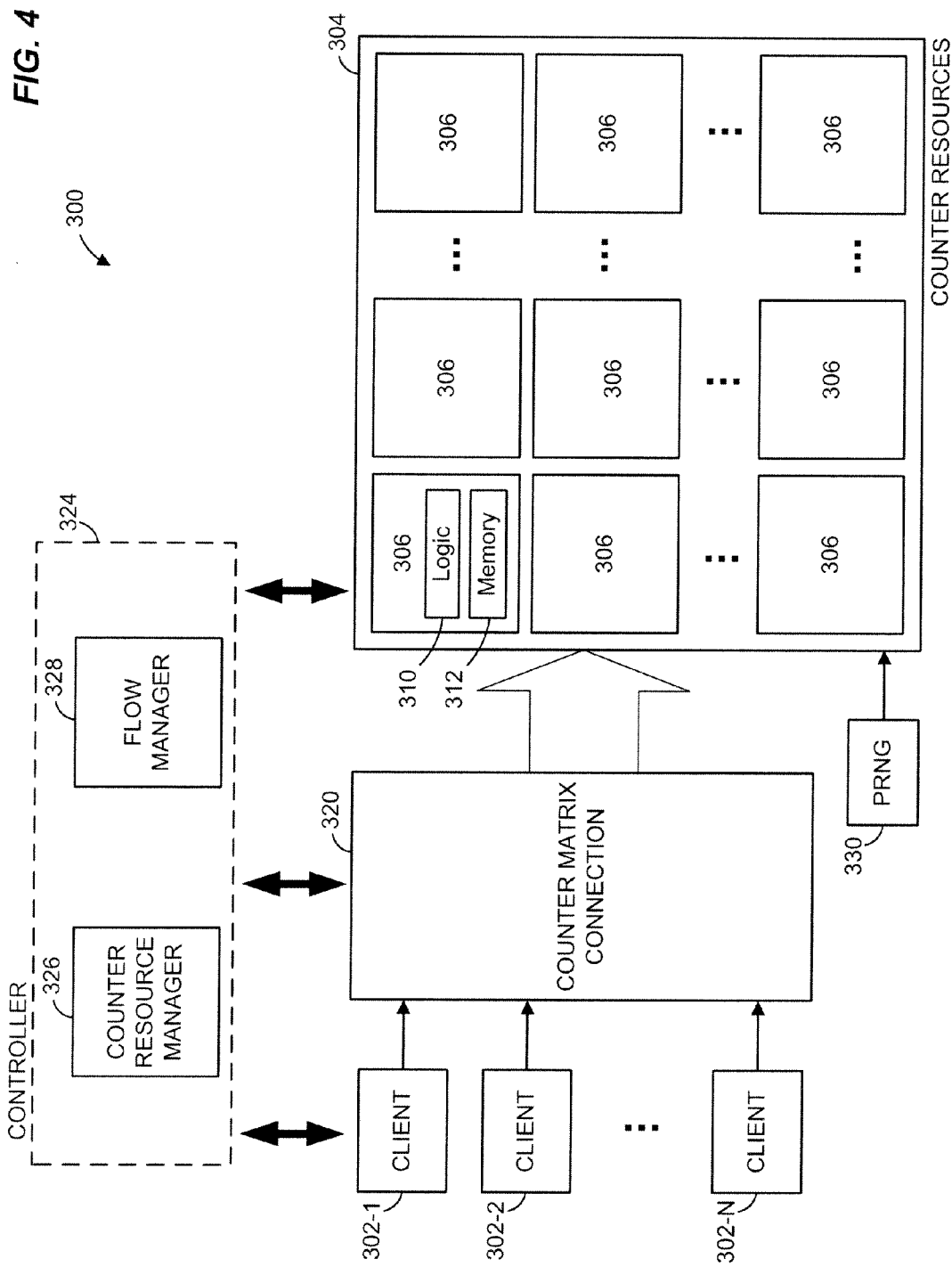
FIG. 4 is a block diagram of an example counter system that utilizes counter configuration techniques of the present disclosure, according to an embodiment.

FIG. 4 is a block diagram of an example counter system 300 that utilizes counter configuration techniques of the present disclosure, according to an embodiment. The counter system 300 is included in a network device, in an embodiment, such as a router, bridge, or other network switch, for example. In one embodiment, the counter system 300 is included in a network device that is configured to operate within an Ethernet system.

The counter system 300 includes clients 302-1 through 302-N representing various applications within the network device, each of which performs operations that utilize one or more counters. The applications may require a count of the number of data units (e.g., packets or cells) meeting certain criteria, for example, such as how many data units are in a particular state, and/or how many data units have a particular characteristic. For example, a traffic measurement application may generate indicators of traffic bandwidth based on the number of data units received (or forwarded) by the network device, or the number of data units identified as belonging to a particular flow, in a particular time frame. As another example, a debug application may generate indicators of network performance based on the number of data units dropped by the network device. Other applications may instead require a count of the total number of bytes included in the data units that meet the criteria. For example, in a system where packets are of variable length, a more precise traffic measurement application may generate indicators of traffic bandwidth based on the total number of bytes in packets that are received (or forwarded) by the network device.

To support the needed counters, the counter system 300 includes counter resources 304 (e.g., counter logic and storage for count value hits). In the embodiment seen in FIG. 4, the counter resources 304 include a number of counter resource blocks 306, with each counter resource block 306 including counter logic 310 that manages the operation of one or more counters, in part by manipulating count value bits stored in a respective memory 312. For clarity, the counter logic 310 and the memory 312 are shown only for a single counter resource block 306 in FIG. 4. In an alternative embodiment, the counter resources 304 include only a single counter resource block 306.

Each counter resource block 306 included in the counter resources 304 can be configured as a single counter or as multiple counters, in an embodiment. Moreover, each counter of a counter resource block 306 can be configured to operate as a counter estimator (e.g., a statistical counter having operation similar to that described above in connection with FIG. 1, FIG. 2, and/or FIG. 3), or as an exact, binary counter, in an embodiment. Thus, the counter logic 310 of each counter resource block 306 can be configured to manage the operation of multiple binary counters, multiple statistical counters, or a mixture of one or more binary counters and one or more statistical counters, in various different scenarios. According to these different scenarios, the respective memory 312 can store one or more sets of binary counter bits, and/or one or more sets of mantissa and exponent bits. In an alternative embodiment, some counter resource blocks 306 can only be configured as exact counters and other counter resource blocks can only be configured as statistical counters.

Figure 5:
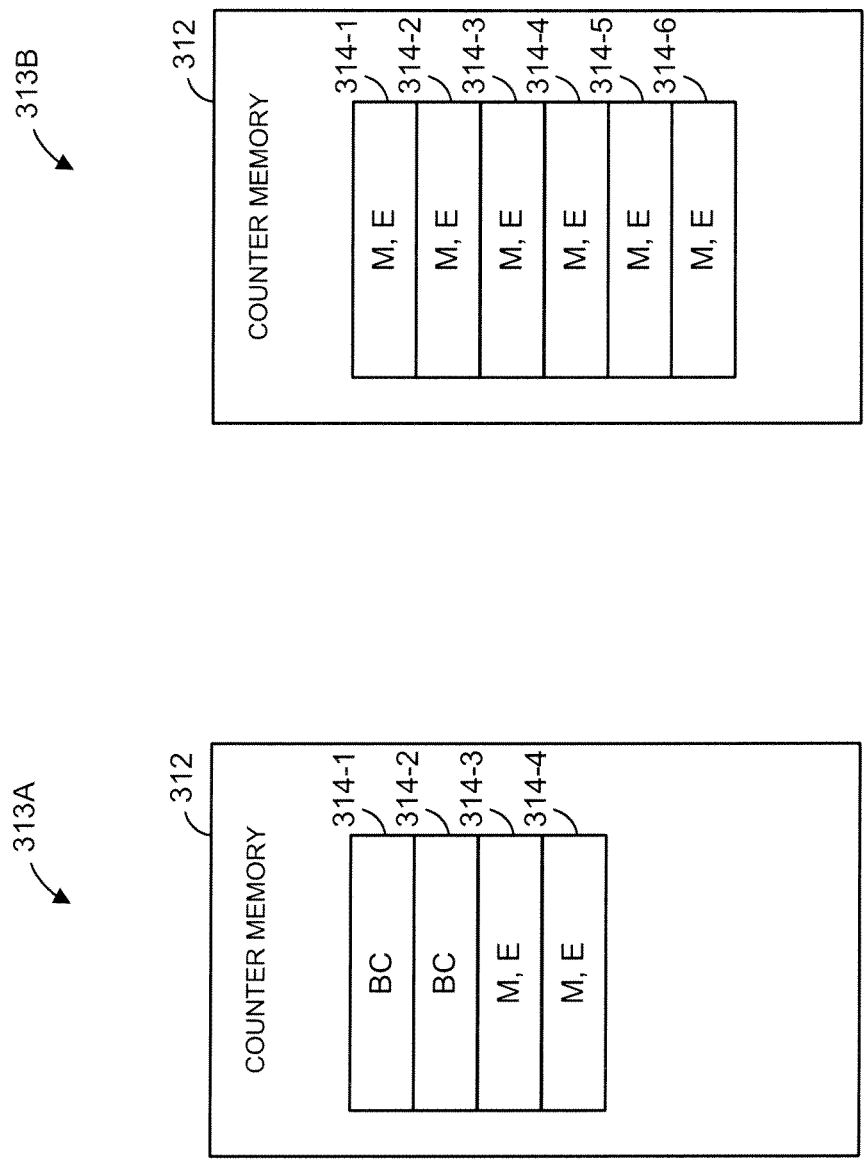
FIG. 5 is a block diagram of example configurations of a memory within a counter block of the counter system of FIG. 4, according to an embodiment and scenario.

FIG. 5 is a block diagram of example configurations 313A, 313B of the memory 312 within a counter block 306 of the counter system of FIG. 4, according to an embodiment and scenario. Each set of count value bits 314 corresponds to a single counter, in an embodiment. The first configuration 313A results from a client (e.g., client 302-1 of FIG. 4) requesting two binary counters and two counter estimators, in an embodiment. Thus, the memory 312 is configured such that count value bits 314-1 and 314-2 are dedicated to respective binary counters, and such that count value bits 314-3 and 314-4 are dedicated to respective counter estimators (statistical counters). In an embodiment, each of the four sets of count value bits 314-1 through 314-4 is updated based on a different counting event. In one embodiment and scenario, for example, count value bits 314-1 are updated to increment the counter each time a packet is received by a network device, count value bits 314-2 are updated to increment the counter each time a packet is dropped, etc.

The second configuration 313B results from the same application (e.g., client 302-1) or a different application (e.g., client 302-2) requesting six counter estimators and no binary counters. Thus, the memory 312 is configured such that count value bits 314-1 through 314-6 are dedicated to respective counter estimators. The first configuration 313A may represent a scenario in which a client 302 requires 100% accuracy from two counters, while the second configuration 313B may represent a scenario in which a client 302 requires more counters but less accuracy or precision, for example. In an embodiment, each of the six sets of count value bits 314-1 through 314-6 is updated based on a different counting event. In one embodiment and scenario, for example, count value bits 314-1 are incremented (with increment probability $P_1$) each time a packet is received by a network device, count value bits 314-2 are incremented (with increment probability $P_2$) each time a packet is determined to exceed a particular packet length, etc.

Referring again to FIG. 4, the example counter system 300 also includes a controller 324 (e.g., a software controller, in an embodiment), where the controller 324 includes both a counter resource manager 326 and a flow manager 328. For ease of explanation, operation of the controller 324 is described with reference to a single client, client 302-1. In an embodiment, the client 302-1 requests counter resources from the counter resources manager 324. The request includes the desired number of counters, as well as the desired properties for each of those counters (e.g., counter accuracy, and whether the counter counts data units or bytes), in an embodiment. The counter resources manager 324 then associates one or more of the counter resource blocks 306 with client 302-1, in an embodiment. In particular, in an embodiment, the counter resources manager 324 configures a hardware mapping table to associate the particular counter resource block(s) 306 with the client 302-1.

The counter resources manager 324 also, in an embodiment, configures the associated counter resource block(s) 306 based on the counter parameters specified in the request from the client 302-1. In an embodiment, this configuration includes configuration of the logic 310 (e.g., for exact or statistical operation), and includes allocation of bits (e.g., to mantissa and exponent bits or one or more counters, and/or to bits of a binary counter), within each associated counter resource block 306. The counter resource manager 324 configures requested statistical counters to operate in a manner similar to that described above with reference to FIG. 1, FIG. 2 and/or FIG. 3, in various embodiments.

The client 302-1 further requests that the flow manager 328 installs flows for the various counters, in an embodiment. Each installed flow is associated with a counter, in an embodiment. Once installed, each detected data unit in the flow serves as a counting event for the corresponding counter, similar to the "counting event" indicator described with reference to FIG. 1, in an embodiment.

The example counter system 300 also includes a pseudorandom number generator 330 that generates pseudorandom numbers that are provided to the counter logic 310 of each counter resource block 306 that is configured to support at least one statistical counter (i.e., for comparison with an increment probability determined by the counter logic 310). In an alternative embodiment, each counter resource block 306 includes a different, dedicated pseudorandom number generator similar to pseudorandom number generator 330 (e.g., similar to the embodiment seen in FIG. 1, in which counter block 10 includes a dedicated pseudorandom number generator 26).

In some embodiments, the client 302-1 also, during counter operation, sends additional information to the counter logic 310 of each associated counter block 306, such as data unit lengths (e.g., in an embodiment and scenario where data unit length is used to calculate an increment probability for a statistical data unit counter) similar to the "weight" indicator of FIG. 1, and/or data unit indicators similar to the "counting event" indicator of FIG. 1. In some of these embodiments, the client 302-1 also sends counter indices, or other counter identifiers, with this additional information, such that the counter logic 310 can identify the counter to which the additional information corresponds. For example, in one embodiment, the client 302-1 sends a counter number with each counting event indicator, so that the counter logic 310 receiving the information can identify which counter should be incremented in response to the indicator.

Tables 2-5 below illustrate various example scenarios for an embodiment of the counter system 300, with the different tables corresponding to requests from different clients of clients 302-1 through 302-N, or corresponding to requests from a single one of clients 302-1 through 302-N at different times. In the embodiment corresponding to the scenarios of Tables 2-5, the counter parameters determined based on each request include a first counter type indicating whether each requested counter is a data unit (e.g., packet or cell) counter or a byte counter, a second counter type indicating whether each requested counter is an exact counter or a statistical counter, and a bit allocation that specifies either a binary counter bit size (for each requested exact counter), or both a mantissa bit size and an exponent bit size (for each requested statistical counter). Also shown in each of Tables 2-5 is the maximum count value that results when using the corresponding counter parameters.

Moreover, the embodiment corresponding to Tables 2-5 is one in which a client that submits a request is allocated a single block of the counter resource blocks 306, and in which each memory 312 can store up to 72 bits for representing the counter values for all counters requested by the client. In other embodiments, however, a single client 302 can be allocated more than one counter resource block 306, and/or each counter resource block 306 includes a memory 312 with more than or fewer than 72 bits. In various embodiments, each counter resource block 306 can support a maximum of two to eight counters. In other embodiments, each counter resource block 306 can support more than eight counters.

In the first example scenario, one of clients 302-1 through 302-N requests one exact data unit counter and one exact byte counter:

TABLE 2

Counter Parameters

| # Cntr | Measurement Quanta | Exact/ Statistical | Binary Ctr Size (bits) | M Size (bits) | E Size (bits) | Max Value |
|---|---|---|---|---|---|---|
| 1 | Data unit | Exact | 33 | N/A | N/A | $2^{33} - 1$ |
| 2 | Byte | Exact | 39 | N/A | N/A | $2^{39} - 1$ |

In the second example scenario, one of clients 302A-302N requests three exact packet counters:

TABLE 3

Counter Parameters

| # Cntr | Measurement Quanta | Exact/ Statistical | Binary Ctr Size (bits) | M Size (bits) | E Size (bits) | Max Value |
|---|---|---|---|---|---|---|
| 1 | Data unit | Exact | 24 | N/A | N/A | $2^{24} - 1$ |
| 2 | Data unit | Exact | 24 | N/A | N/A | $2^{24} - 1$ |
| 3 | Data unit | Exact | 24 | N/A | N/A | $2^{24} - 1$ |

Because the bit budget of the memory 312 is fixed at 72 bits, the three data unit counters cannot, on average, dedicate as many bits to the counter value relative to the first example scenario of Table 2, which in turn limits the maximum counter values as seen in Table 3.

In the third example scenario, one of clients 302-1 through 302-N requests two statistical data unit counters and two statistical byte counters:

TABLE 4

Counter Parameters

| # Cntr | Measurement Quanta | Exact/ Statistical | Binary Ctr Size (bits) | M Size (bits) | E Size (bits) | Max Value |
|---|---|---|---|---|---|---|
| 1 | Data unit | Statistical | N/A | 14 | 4 | $2^{30}$ |
| 2 | Data unit | Statistical | N/A | 14 | 4 | $2^{30}$ |
| 3 | Byte | Statistical | N/A | 14 | 4 | $2^{30}$ |
| 4 | Byte | Statistical | N/A | 14 | 4 | $2^{30}$ |

As seen in Table 4, each requested counter has a much higher maximum counter value as compared to the exact counters of Tables 2 and 3, despite the fact that a higher number of counters is requested in Table 4. This configuration, however, results in a lower level of counter accuracy and precision for each counter than would be achieved with an exact counter.

In the fourth example scenario, one of clients 302-1 through 302-N requests three statistical data unit counters and three statistical byte counters:

TABLE 5

Counter Parameters

| # Cntr | Measurement Quanta | Exact/ Statistical | Binary Ctr Size (bits) | M Size (bits) | E Size (bits) | Max Value |
|---|---|---|---|---|---|---|
| 1 | Data unit | Statistical | N/A | 9 | 3 | $2^{17}$ |
| 2 | Data unit | Statistical | N/A | 9 | 3 | $2^{17}$ |
| 3 | Data unit | Statistical | N/A | 9 | 3 | $2^{17}$ |
| 4 | Byte | Statistical | N/A | 9 | 3 | $2^{17}$ |
| 5 | Byte | Statistical | N/A | 9 | 3 | $2^{17}$ |
| 6 | Byte | Statistical | N/A | 9 | 3 | $2^{17}$ |

As seen in Table 5, each requested counter still has a fairly high maximum counter value, despite the fact that a relatively large number of counters is requested. However, this configuration results in an even larger level of inaccuracy and imprecision per counter than the configuration seen in Table 4, due to the smaller number of mantissa bits.

As seen in the example embodiment and scenarios of Tables 2-5 above, a large degree of flexibility can be provided in allocating a fixed number of counter resources (e.g., bits of a memory) to a number of counters, with many possible tradeoffs among the number of counters, accuracy or precision of each counter, and maximum counter value of each counter. Thus, counter resources may be more efficiently utilized by requesting exact counters only where 100%, or very close to 100%, accuracy or precision is required. For example, a client that requests counters for an application that detects "fat flows" or "elephants" (i.e., flows that convey large amounts of information) may only need a rough approximation of the number of packets in a given time frame. If so, the client may request a statistical counter with a high maximum value (due to a large number of exponent bits), but an accuracy less than 100%. Other applications for which statistical counters may be acceptable include applications that generate data for certain types of histograms, such as queue fill levels (e.g., for latency estimation), or device-internal first-in, first-out (FIFO) buffer levels (e.g., to evaluate architectural designs based on statistical phenomena in an application specific integrated circuit (ASIC)). Other applications may require exact counters, or counters with an accuracy so high that the number of mantissa bits in a statistical counter would be prohibitively large. For example, applications for which exact counters may be required include dropped packet counters for debug applications where it is expected that only a small number of packets may be dropped.

Figure 6:
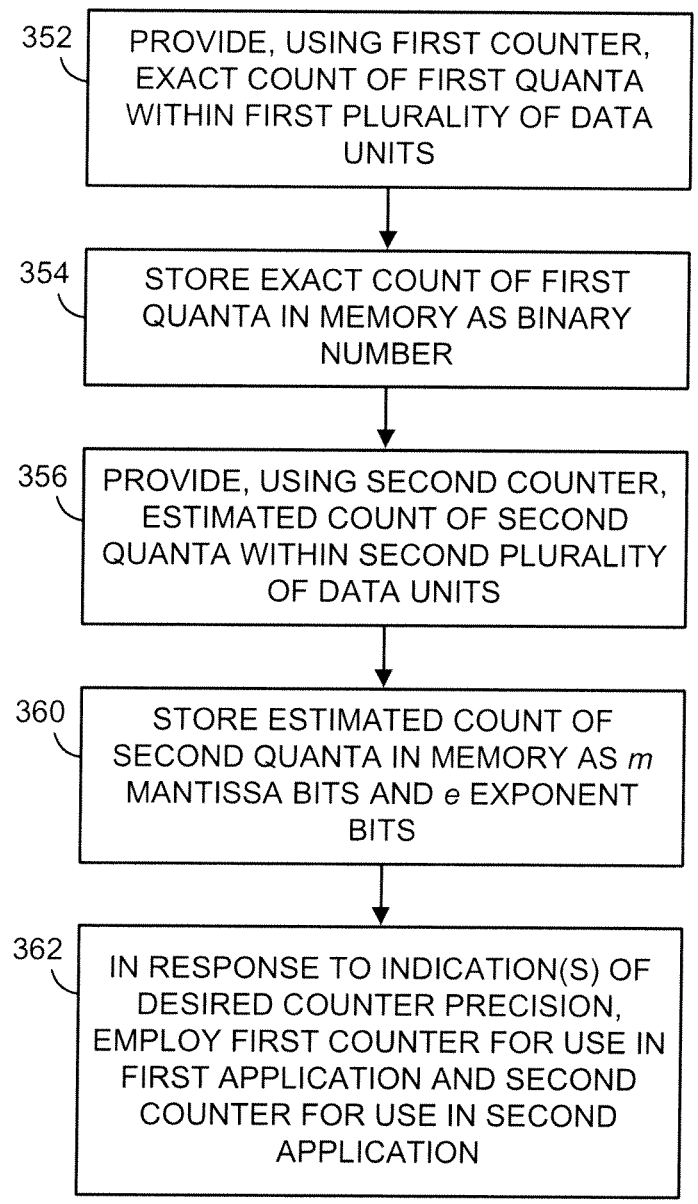
FIG. 6 is a flow diagram of an example method of configuring counter resources in a network device, according to an embodiment.

FIG. 6 is a flow diagram of an example method 350 of configuring counter resources in a network device, according to an embodiment. In an embodiment, the method 350 is implemented by the controller 324 and the counter resources 304 of FIG. 4.

At block 352, an exact count of first quanta within a first plurality of data units is provided using a first counter. The first quanta is similar to the counting quanta q described above, in an embodiment, and is any suitable unit (e.g., packets, cells, blocks of bytes, etc.). The first plurality of data units corresponds to the data units within a particular flow, in an embodiment. At block 354, an exact count of the first quanta is stored in a memory as a binary number.

At block 356, an estimated count of second quanta within a second plurality of data units is provided using a second counter. The second quanta is similar to the counting quanta q described above with reference to FIG. 1, in an embodiment, and is any suitable unit (e.g., packets, cells, blocks of bytes, etc.). In some scenarios, the second quanta is different than the first quanta. The second counter is arranged to operate according to the process described with reference to FIG. 1, and/or the process of FIG. 3 (or an equivalent process), in various embodiments. The second plurality of data units corresponds to the data units within a particular flow, in an embodiment, where the flow is the same as or different than a flow monitored using the first counter. At block 360, the estimated count of the second quanta is stored in a memory as in mantissa bits representing a mantissa value M and e exponent bits representing an exponent value E.

At block 362, in response to one or more indications of desired counter precision, the first counter is employed for use in a first application and the second counter is employed for use in a second application. In one embodiment, for example, the first counter is employed for use by client 302-1 of FIG. 4, and the second counter is employed for use by client 302-2 of FIG. 4. The indication(s) of desired counter precision are received from the clients/applications requesting counter resources, in an embodiment. In one embodiment and/or scenario, a first request for counter resources from the first application corresponds to a higher level of desired counter precision than a second request for counter resources from the second application. In one embodiment, each indication of desired counter precision includes one or more counter parameters such as counter type (statistical or exact), and, for statistical counters, a number of mantissa bits.

In some embodiments, the blocks seen in FIG. 6 do not occur in the order depicted. In one embodiment and/or scenario, for example, the first counter and the second counter do not exist until the appropriate counter logic is configured to support the counters. In such an embodiment, block 362 occurs before blocks 352, 354, 356 and 360.

Figure 7:
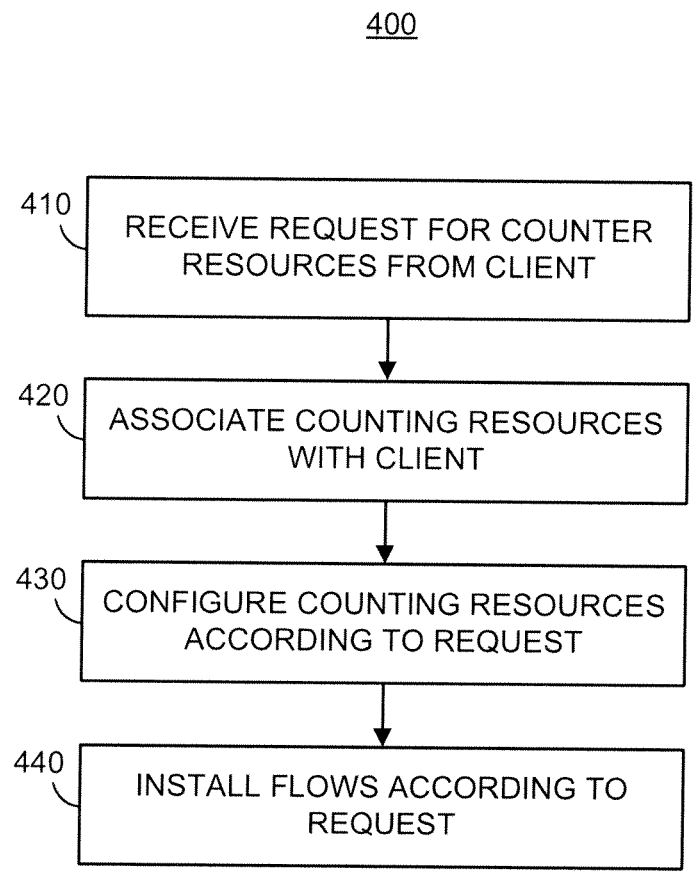
FIG. 7 is a flow diagram of another example method of configuring counter resources in a network device, according to an embodiment.

FIG. 7 is a flow diagram of another example method 400 of configuring counter resources in a network device, according to an embodiment. In an embodiment, the method 400 is implemented in whole or in part by the controller 324 of FIG. 4.

At block 410, a request for counter resources is received. In one embodiment, for example, the request is received from a client similar to client 302-1 of FIG. 4. The request for counter parameters specifies a counter type (statistical or exact) of each requested counter, and a bit allocation for each requested counter, in an embodiment. In one embodiment, the bit allocation for a particular requested counter specifies a number of bits representing an integer value (for an exact counter), or a number of mantissa bits representing a mantissa value and a number of exponent bits representing an exponent value (for a statistical counter). In some embodiments, the set of counter parameters also includes other counter parameters, such as whether each requested counter "weight-enabled" (i.e., whether the counter employs a "weight" indicator similar to that described with reference to FIG. 1). A counter is weight-enabled if it is a byte counter rather than a data unit counter, in an embodiment.

At block 420, counting resources are associated with the client in response to the request received at block 410. In embodiment, one or more resource blocks similar to counter resource blocks 306 of FIG. 4 are associated with the client, with the number of blocks being determined based on the needs of the client (e.g., the number of desired counters and the desired accuracy or precision). In an embodiment, the resources are associated with the client at block 420 at least in part by configuring a mapping table.

At block 430, the counting resources associated with the client at block 420 are configured according to the request received at block 410. To this end, in an embodiment, the method 400 configures logic within the counter resource block(s) to operate according to the counter parameters specified by the request. For exact counters, the counter logic is configured to increment each counter value each time that a counting event occurs. For statistical counters, the counter logic is configured to calculate an increment probability P for each counting event, and to increment the mantissa (and exponent value, if the mantissa value rolls over) with probability P. In one embodiment, for example, the counter logic is configured, for each statistical counter, to operate the statistical counter in a manner similar to a counter in the counter block 10 of FIG. 1, and/or according to the procedure of FIG. 3 (or a suitable, equivalent procedure). Further, in an embodiment, the appropriate numbers of storage bits for each counter (to satisfy the counter parameters in the client request received at block 410) are assigned to each counter at block 430. In some embodiments, the counters are configured at block 430 also based on the number of available bits in the memory. In one embodiment, for example, the method 400 determines a "best" match based on each request for counter resources, but will still configure a bit allocation even if the requested counter parameters cannot be fully supported in light of the counter types, counter accuracy/precision levels, and the available number of bits.

At block 440, flows are installed according to a request from the client. The client request is either the request received at block 410, or a separate request, according to different embodiments. Once a flow is installed, each detected data unit in the flow serves as a counting event for the corresponding counter, similar to the "counting event" indicator described with reference to FIG. 1, in an embodiment.

In some embodiments, at least portions of the counting techniques described above are implemented in hardware or firmware. For example, at least the counter update policy module 14 and memory 16 of the counter 10 of FIG. 1 are implemented in hardware, allowing the counter 10 to count data units or bytes in real time and at wire speed, in an embodiment. As another example, in an embodiment, the counter resources 304 of the counter system 300 (and, in some embodiments, the counter matrix connection 320) of FIG. 4 is implemented in hardware. In some of these embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic arrays (PLA), etc. In an embodiment, the controller 324 of FIG. 1 is, in whole or in part, implemented in software.

Embodiments of the present disclosure may be embodied in any type of network device used in a wired or wireless communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A network device comprising:
a memory configured to store a plurality of bits;
a counter update logic module configured to
receive a plurality of indicators, each indicator corresponding to a respective data unit among a plurality of data units in a data flow, wherein each indicator indicates that the respective data unit satisfies one or more criteria,
estimate a count of quanta within a plurality of data units in the data flow based on statistical sampling of the plurality of data units, which includes statistical sampling of the plurality of indicators, and
store the estimated count of quanta in the memory as m mantissa bits and e exponent bits, wherein the m mantissa bits represent a mantissa value M and the e exponent bits represent an exponent value E.

2. A network device according to claim 1, wherein the count of quanta within the plurality of data units is one of:
a count of data units within the plurality of data units, or
a count of blocks of length q within the plurality of data units, wherein q is an integer greater than or equal to one.

3. A network device according to claim 1, wherein the counter update logic module is configured to estimate the count of quanta at least in part by:
for each data unit within the plurality of data units, updating the m mantissa bits to increment the mantissa value M with an increment probability P; and
updating the e exponent bits to increment the exponent value E when the mantissa value M rolls over.

4. A network device according to claim 3, wherein the increment probability P decreases exponentially as the exponent value E is incremented.

5. A network device according to claim 1, wherein the count of quanta within the plurality of data units is the count of blocks of length q within the plurality of data units, and wherein the length q is equal to a specified minimum data unit length corresponding to the plurality of data units.

6. A network device according to claim 5, wherein the plurality of data units is a plurality of packets, and wherein the length q is a number of bytes.

7. A network device according to claim 5, wherein the counter update logic module is configured to estimate the count of quanta at least in part by:
for each data unit within the plurality of data units,
updating the m mantissa bits to increment the mantissa value M with an increment probability P, and
updating the m mantissa bits to increment the mantissa value M when the respective data unit exceeds a threshold length; and
updating the e exponent bits to increment the exponent value E when the mantissa value M rolls over.

8. A network device according to claim 7, wherein the increment probability P is based on the exponent value E, the specified minimum data unit length, and the length q.

9. A network device according to claim 1, wherein the estimated count of quanta is equal to $M*2^E$.

10. A network device according to claim 1, wherein m is greater than or equal to two.

11. A network device according to claim 1, wherein each indicator of the plurality of indicators is an indicator that the respective data unit of the plurality of data units is sent through the network device.

12. A network device according to claim 1, wherein each indicator of the plurality of indicators is an indicator that the respective data unit of the plurality of data units is processed in the network device.

13. A network device according to claim 1, wherein each indicator of the plurality of indicators indicates that the respective data unit belongs to the data flow.

14. A network device according to claim 1, wherein each indicator of the plurality of indicators indicates that the respective data unit has a respective length that meets a length criterion.

15. A network device according to claim 1, wherein each indicator of the plurality of indicators indicates that the respective data unit has a respective address that meets an address criterion.

16. A network device according to claim 1, wherein each indicator of the plurality of indicators indicates that the respective data unit is associated with a respective packet state that meets a packet state criterion, the respective packet state having been determined by the network device.

17. A method in a network device, the method comprising:
receiving a plurality of indicators, each indicator corresponding to a respective data unit among a plurality of data units in a data flow, wherein each indicator indicates that the respective data unit satisfies one or more criteria,
estimating a count of quanta within the plurality of data units in a data flow based on statistical sampling of the plurality of data units, which includes statistical sampling of the plurality of indicators, and
storing the estimated count of quanta in a memory as m mantissa bits and e exponent bits, wherein the m mantissa bits represent a mantissa value M and the e exponent bits represent an exponent value E.

18. A method according to claim 17, wherein estimating the count of quanta includes:
for each data unit of the plurality of data units, updating the m mantissa bits to increment the mantissa value M with an increment probability P; and
updating the e exponent bits to increment the exponent value E when the mantissa value M rolls over.

19. A method according to claim 18, wherein the increment probability P decreases exponentially as the exponent value E is incremented.

20. A method according to claim 17, wherein the count of quanta within the plurality of data units is the count of blocks of length q within the plurality of data units, and wherein the length q is equal to a specified minimum data unit length corresponding to the plurality of data units.

21. A method according to claim 20, wherein estimating the count of quanta includes:
for each data unit within the plurality of data units,
updating the m mantissa bits to increment the mantissa value M with an increment probability P, and
updating the m mantissa bits to increment the mantissa value M when the respective data unit exceeds a threshold length; and
updating the e exponent bits to increment the exponent value E when the mantissa value M rolls over.

22. A method according to claim 21, wherein the increment probability P is based on the exponent value E, the specified minimum data unit length, and the length q.

23. A method according to claim 17, wherein m is greater than or equal to two.

24. A network device comprising:
a memory configured to store a plurality of bits;
a first counter configured to
provide an exact count of first quanta within a first plurality of data units, and
store the exact count of first quanta in the memory as a binary number;
a second counter configured to
provide an estimated count of second quanta within a second plurality of data units, and
store the estimated count of second quanta in the memory as m mantissa bits and e exponent bits, wherein the m mantissa bits represent a mantissa value M and the e exponent bits represent an exponent value E; and
a controller configured to, in response to a first request for counter resources received from a first application and a second request for counter resources received from a second application different from the first application, (i) employ the first counter for use in the first application, and (ii) employ the second counter for use in the second application,
wherein the first request for counter resources corresponds to a higher level of desired counter precision than the second request for counter resources.

25. A network device according to claim 24, wherein:
the exact count of first quanta within the first plurality of data units is one of
an exact count of data units within the first plurality of data units, or
an exact count of blocks of length q1 within the plurality of data units, wherein q1 is an integer greater than or equal to one; and
the estimated count of second quanta within the second plurality of data units is one of
an estimated count of data units within the second plurality of data units, or
an estimated count of blocks of length q2 within the plurality of data units, wherein q2 is an integer greater than or equal to one.

26. A network device according to claim 24, wherein the second counter is configured to provide the estimated count of second quanta at least in part by:
for each data unit within the second plurality of data units,
updating the m mantissa bits to increment the mantissa value M with an increment probability P, wherein the increment probability P decreases exponentially as the exponent value E is incremented; and updating the e exponent bits to increment the exponent value E when the mantissa value M rolls over.

27. A method in a network device, the method comprising:

providing, using a first counter, an exact count of first quanta within a first plurality of data units;

storing the exact count of first quanta in a memory as a binary number;

providing, using a second counter, an estimated count of second quanta within a second plurality of data units;

storing the estimated count of second quanta in a memory as m mantissa bits and e exponent bits, wherein the m mantissa bits represent a mantissa value M and the e exponent bits represent an exponent value E; and in response to receiving a first request for counter resources from a first application and receiving a second request for counter resources from a second application different from the first application, (i) employing the first counter for use in the first application, and (ii) employing the second counter for use in the second application, wherein the first request for counter resources corresponds to a higher level of desired counter precision than the second request for counter resources.

28. A method according to claim 27, wherein providing the estimated count of second quanta includes:

for each data unit within the second plurality of data units, updating the m mantissa bits to increment the mantissa value M with an increment probability P, wherein the increment probability P decreases exponentially as the exponent value E is incremented; and updating the e exponent bits to increment the exponent value E when the mantissa value M rolls over.

* * * * *